United States Patent [19]

Haag et al.

[11] 4,106,421

[45] Aug. 15, 1978

[54] METHOD OF COATING UTILIZING RHEOLOGICALLY MODIFIED METAL DECORATING AND AQUEOUS COATING COMPOSITION COMPRISING LATEX AND AMINOPLAST

[75] Inventors: Thomas H. Haag, Feasterville; William H. Brendley, Jr., Hatboro, both of Pa.; Richard Martorano, Marlton, N.J.

[73] Assignee: Rohm and Haas Company, Philadelphia, Pa.

[21] Appl. No.: 771,876

[22] Filed: Feb. 25, 1977

Related U.S. Application Data

[60] Division of Ser. No. 372,447, Jun. 21, 1973, Pat. No. 4,062,821, which is a continuation-in-part of Ser. No. 333,594, Feb. 20, 1973.

[51] Int. Cl.$^2$ .................................... B21D 51/26
[52] U.S. Cl. ............................... 113/120 A; 72/46; 260/29.4 UA; 260/39 R; 260/42.21; 260/851; 260/855; 260/856; 427/388 B; 428/460; 428/461
[58] Field of Search ............... 427/388 B; 72/46; 113/120 A; 260/29.4 UA, 851, 855, 856, 33.4 R, 39 R, 42.55, 42.21; 428/460, 461

[56] References Cited

U.S. PATENT DOCUMENTS

| | | | |
|---|---|---|---|
| 3,352,806 | 11/1967 | Hicks | 260/29.4 UA |
| 3,836,494 | 9/1974 | Hekal et al. | 260/29.4 UA |

*Primary Examiner*—Lorenzo B. Hayes

[57] ABSTRACT

Disclosed are aqueous acrylic thermosetting resinous compositions having an alkaline pH and containing a specific rheological modifier in critical amount, and application to metal sheets, curing the same, and in a preferred embodiment shaping the metals to achieve metal decoration. By "decorating" is meant applying synthetic resinous coatings to the metal followed by a mechanical forming operation such as the formation of can bodies or screw-threaded bottle caps. The compositon is thermosettable and comprises (A) a water-insoluble addition copolymer of certain monomers in latex form, (B) a water-soluble urea-formaldehyde or triazine-formaldehyde reaction product or a water-soluble methanol or ethanol ether thereof, or a combination of the aminoplast products, and, as an essential component, (C) a water-soluble polyethylene glycol having an average molecular weight of from about 400 to about 100,000. The copolymer contains small amounts of carboxyl groups, and amide or hydroxyl functionality, or both of the latter. The weight ratio on a solids basis of (A) to (B) is from 35:65 to 65:35, and the solids content is between 40 and 80 percent, the amount of said water-soluble rheology modifier being from 1 to 5 percent based on the total weight of (A) and (B), on a solids basis.

11 Claims, No Drawings

METHOD OF COATING UTILIZING RHEOLOGICALLY MODIFIED METAL DECORATING AND AQUEOUS COATING COMPOSITION COMPRISING LATEX AND AMINOPLAST

This is a division, of application Ser. No. 372,447 filed June 21, 1973 which in turn is a continuation-in-part of Ser. No. 333,594, filed Feb. 20, 1973. Ser. No. 372,447 is now U.S. Pat. No. 4,062,821.

This invention concerns metal decorating and thermosetting coating compositions which are applied from aqueous media to the surfaces to be coated. By "metal decorating" is meant coating a metal sheet with a suitable coating composition and then subjecting the sheet to various mechanical forming processes. Examples of metal decorated items which are in common use are beer cans, beverage cans, vegetable cans, screw cap jars and aerosol containers. The coatings for such items must be able to withstand a variety of fabrication treatments without cracking or chipping of the coating. These fabrication treatments range from very mild treatments (e.g., the formation of can bodies) to extremely severe (e.g., the fabrication of aerosol domes). Of course, the compositions can also be applied to previously shaped articles such as mandrel-formed two piece can bodies, toothpaste tubes, etc.

In a typical process for the formation of a finished metal decorated item, a pigmented base white coating composition is roller-coated onto a metallic substrate and the coated substrate is subjected to a baking operation. A decorative printing is then applied over the base white coat and, while the ink is still wet, a clear overprint varnish is roller-coated over the ink to protect it. The coated metallic sheet is then subjected to a baking operation to develop final hardness. The finished coated metal sheets may then be stacked and stored for various time periods prior to fabricating into the final product. It is essential that the coating have good hot stack resistance to prevent the metal sheets from adhering one to another since this results in marring of the coatings. The coated sheets are finally fabricated into various forms. The fabrication requirements will vary depending upon the end use of the material, e.g., whether it is to be fabricated into cans, lids, screw caps, etc. In addition to withstanding the various fabricating operations performed on the metal, many end uses require processing or sterilization operations which involve high temperature conditions. In such instances, the coating must possess good overbake properties.

In order to obtain maximum hot stacking properties for coatings, it is desirable to use a thermosetting coating composition which results in a high degree of crosslinking when cured. However, the cured coating must also possess sufficient flexibility to permit the fabrication treatment to which it will be subjected. If the coated metal is to be subjected to severe fabricating operations, a "soft" thermosetting resin should be used; whereas if the coated metal is to be subjected to relatively mild fabricating conditions, a "hard" thermosetting resin may be employed.

Heretofore, metal decorating has involved the application of primers comprising certain corrosion-protective pigments in non-aqueous vehicles based on a drying oil, such as linseed oil, a fast-drying varnish base comprising natural resins, or a mixture of natural and synthetic resins, or an alkyd base modified with a urea-, melamine-, or phenol- formaldehyde resin. Such coating compositions are usually supplied in high-boiling solvents to insure good flow and leveling in the thin films applied during a roller-coating operation. The solvents are frequently of an inflammable character and often are the type which give off noxious fumes during the coating operation. To cope with the fire and health hazards, protection is usually provided by way of solvent recovery systems. Moreover, recent interest in air pollution control has been aimed at reducing or eliminating organic solvent emmission to the atmosphere.

There has long been a demand for thermosetting coating compositions which can be applied from an aqueous medium to avoid air pollution, fire hazards and other problems which attend the use of organic solvent coating compositions. However, earlier aqueous coating systems, such as shown in U.S. Pat. Nos. 2,760,886 to Prentiss et al; 2,918,391 to Hornibrook et al; and 3,033,811 to Brown et al have not proved fully satisfactory for coating metals for uses according to the present invention by direct-roller coating machinery because they tend to dry on the roller causing difficulties in clean up or blister when the wet products are put directly in an oven, or are not amenable to post-forming operations because of brittleness or to handling because of softness. The greatest difficulty with water based systems is to obtain rheological properties suitable for direct-roll coating of the system. Thus, a composition is required which possesses flow and leveling properties such that when applied by a direct-roll coater, it will form a uniform and smooth surface which does not contain striations. The deficiency of aqueous emulsions from the standpoint of flow and leveling is well recognized in the metal coating industry, see *Paint and Varnish Production,* February, 1964, pages 28–33. The flow and leveling of the pigmented base coat is most critical since pigmentation noticeably reduces flow in aqueous systems.

Application Ser. No. 130,808, filed Apr. 2, 1971, describes a thermosetting coating composition which can be applied by direct-roller processes to metals to provide films with good appearance which can be post-formed and which provide, after baking, clear or pigmented coatings possessing excellent water-resistance and solvent-resistance, excellent adhesion to a variety of substrates, and high gloss. The coating compositions described in that application are advantageously used in connection with direct-roll coaters wherein the rollers are of low Durometer hardness, e.g., about 12. However, since soft rubber rolls do not have good wear characteristics, it is desirable to provide a thermosetting resin coating composition which can be applied by a direct-roll coater wherein the rolls are of high Durometer hardness, e.g., about 20–50, without sacrificing flow and leveling properties. This invention provides such a coating composition.

The coating compositions of this invention comprise an alkaline aqueous blend having a binder consisting essentially of:

A. A latex of a water-insoluble addition copolymer of
(1) 28 to 70% of a monovinyl aromatic monomer,
(2) 18 to 68% of at least one ester of acrylic or methacrylic acid, (3) at least one olefinically unsaturated monomer having at least one of an amide and a hydroxyl group, and (4) an olefinically unsaturated monomer having a carboxyl group, the amount of (3) being from 1.5 to 10%, preferably 1.5 to 5% for metal decorating, when said monomer contains an amide group and from 1.5 to 15%, preferably 1.5 to 10% for metal decorating, when said monomer contains a hydroxyl group and the amount of (4) being from 0.5 to 5%, preferably 0.5 to 2% for metal decorating, based on the total weight of monomers, the Tg of the polymer being below 45° C., and B. a water-soluble condensation product of urea or a triazine with formaldehyde or a water-soluble methanol or ethanol ether thereof, the weight ratio of A to B on a solids basis being from 35:65 to 65:35, the minimum film-forming temperature of the composition being no higher than about 25° C., the solids content of the composition being between 40 and 80% by weight, said composition containing from 1 to 5% by weight of a water-soluble rheology modifier having a number average molecular weight of from about 400 to about 100,000 comprising a polyethylene glycol or a poly(ethylene oxide), based on the weight of A and B.

Desirably, B is the reaction product of a urea-formaldehyde adduct with methanol, the mole ratio of urea:formaldehyde:methanol being in the range of 1/1.75–3/2–3.5; or a melamine-formaldehyde adduct with methanol, the mole ratio of melamine:formaldehyde:methanol being in the range of 1/7–10/12–17, or a mixture thereof.

In copolymer A, (1) is preferably styrene or vinyl-toluene, (2) is an ester of at least one of acrylic acid and an alkanol having from about 2 to 12 carbon atoms or an ester of methacrylic acid and an alkanol having from about 6 to about 14 carbon atoms, (3) is at least one of methacrylamide, acrylamide, hydroxyethyl acrylate or methacrylate or hydroxypropyl acrylate or methacrylate, and (4) is acrylic acid, methacrylic acid or itaconic acid.

If the coated metal is to be subjected to severe fabrication treatments, such as the fabrication of aerosol domes or bottle caps, then the copolymer should be a "soft" copolymer. In this event, the weight ratios of monovinyl aromatic/acrylic ester/amine-containing or hydroxyl-containing monomer or both/unsaturated acid is in the range of 28–52/40–68/1.5–5/.5–2, preferably 35–50/45–60/1.5–3/.5–2, the total being 100. The Tg of the "soft" copolymer should be below 0° C. and, preferably, below −15° C. The urea-formaldehyde adduct is usually needed for severe post-coating fabrication operations, the melamine-formaldehyde adducts being well adapted to less severe application, or in cases where no deformation or mild deformation of the coated product occurs.

For best results, the coating composition should contain a volatile base, a tertiary amine being preferred, and should have a minimum film-forming temperature no higher than about 15° C.

When the coated sheet is to be subjected to mild fabrication treatments such as formed into can bodies, or coated after fabrication, either a "soft" or "hard" copolymer may be used. Either of the aminoplasts, or a combination thereof, may be used for the less severe fabrication procedures or for prefabricated articles.

The most preferred copolymer is a copolymer of styrene, butyl acrylate, at least one of hydroxyethyl methacrylate and methacrylamide, and methacrylic acid.

One of the monomers utilized in a substantial proportion to prepare the addition copolymer is a flexibilizing or "soft" monomer which may be represented by the following formula:

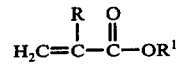

where R is H or alkyl having 1 to 4 carbon atoms and $R^1$ is the straight chain or branched chain radical of a primary or secondary alkanol, alkoxyalkanol or alkylthiaalkanol, the alkanol having from 2 to about 14 carbon atoms, the chain length depending upon the identity of R, examples being ethyl, methylpropyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl, ethylthiaethyl, methylthiaethyl, ethylthiapropyl, n-octyl, 6-methylnonyl, decyl, dodecyl, and the like. When R is alkyl and $R^1$ is alkyl, $R^1$ should have from about 6 to about 14 carbon atoms and when R is H and $R^1$ is alkyl, $R^1$ should have from 2 to about 12 carbon atoms, in order to qualify as a "soft" monomer.

Important properties of the copolymer are its toughness and flexibility, as well as its influence upon the minimum film-forming temperature (MFT) of the coating composition. The glass transition temperature (Tg) of the copolymer and consequently the selection of monomers and proportions thereof depends upon their influence on the Tg. "Tg" is a conventional criterion of polymer hardness and is described by Flory, "Principles of Polymer Chemistry," pp. 56 and 57, (1953), Cornell University Press. While actual measurement of the Tg is preferred, it may be calculated as described by Fox, Bull. Am. Physics Soc. 1, 3, p. 123 (1956). Examples of the Tg of homopolymers and the inherent Tg thereof which permits such calculations are as follows:

| Hompolymer of | Tg |
|---|---|
| n-octyl acrylate | −80° C. |
| n-decyl methacrylate | −60° C. |
| 2-ethylhexyl acrylate | −70° C. |
| octyl methacrylate | −20° C. |
| n-tetradecyl methacrylate | −9° C. |
| methyl acrylate | 9° C. |
| n-tetradecyl acrylate | 20° C. |
| methyl methacrylate | 105° C. |
| acrylic acid | 106° C. |

These or other monomers are blended to give the desired Tg of the copolymer. As is known, for a given number of carbon atoms in the alcohol moiety, the extent and type of branching markedly influences the Tg, the straight chain products giving the lower Tg.

The coating composition of this invention similarly has a critical maximum MFT. MFT is determined by the method described in Resin Review, Vol. 16, No. 2 (1966). This is influenced not only by the Tg of the addition copolymer, but by the plasticizers or coalescing agents used and their amounts. At MFT values appreciably above this maximum, difficulties in obtaining a uniform coating film and lack of film integrity during deformation of the metal are encountered.

In addition to the flexibilizing monomer, the other essential monomers are the "toughening" or "hard" monomers, including the monovinyl aromatic monomer, the unsaturated acid monomer, and the monomers, having hydroxyl and/or amide functionality. The hardness or softness of the acid and other functional monomers is not critical because of the small amounts used.

Styrene and vinyltoluene are examples of the monovinyl aromatics.

The unsaturated carboxylic acid may be a simple monocarboxylic acid, or may be a half ester or half amide of an α,β-unsaturated dicarboxylic acid, and salts thereof with a volatile base such as ammonia, or with a volatile water-soluble amine such as dimethylamine, dimethylethanolamine, triethylamine, triethanolamine, morpholine, N-methyl morpholine, picoline, and the like. Examples of copolymerizable ethylenically unsaturated monocarboxylic or polycarboxylic acids are sorbic, cinnamic, vinyl furoic, α-chlorosorbic, p-vinylbenzoic, acrylic, methacrylic, maleic, fumaric, aconitic, atropic, crotonic, and itaconic acid, or mixtures thereof, with itaconic acid and the α,β-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and furmaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are considered to be "α,β-unsaturated monocarboxylic acids," and the term as used herein includes such esters and amides.

In addition to the acids, also present are an amide-containing monomer such as acrylamide, methacrylamide, or the methylol or methoxymethylol derivatives thereof, or a hydroxyl-containing monomer such as hydroxyethyl or hydroxypropyl acrylate or methacrylate. The hydroxyl-containing and amide-containing monomers may be used together, or singly.

Other ethylenically unsaturated copolymerizable monomers optionally present are useful in combinations with the above mentioned flexibilizing monomers and toughening monomers provided they do not adversely affect the desired properties of the copolymer (e.g., unduly raise the overall Tg). These may be represented by the formula:

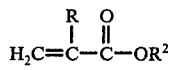

wherein R is as above. $R^2$ is preferably alkyl and is methyl or alkyl having from about 13 to about 20 carbon atoms when R is H, and is alkyl of from 1 to about 5 carbon atoms or alkyl of from about 15 to about 20 carbon atoms when R is methyl. It can be seen from above that for alkyl acrylates and alkyl methacrylates the Tg at first decreases with an increased chain length of the alkyl group and then the Tg again increases; i.e., both hard and soft monomers are known to occur in each group of monomers. Examples of these hard monomers and other hard monomers include: methyl acrylate, vinyl acetate, tetradecyl acrylate, pentadecyl acrylate, methyl methacrylate, ethyl methacrylate, t-butyl acrylate, butyl methacrylate, and pentadecyl methacrylate.

The coating compositions described hereinbefore may be used as a clear top coating or may be pigmented with a variety of pigments as set forth hereinafter.

The preferred emulsion copolymer, having a molecular weight of between about 70,000 and 2,000,000, and preferably between about 250,000 and 1,000,000 is made by the emulsion copolymerization of the several monomers in the proper proportions. Conventional emulsion polymerization techniques are described in U.S. Pat. Nos. 2,754,280 and 2,795,564. Thus, the monomers may be emulsified with an anionic, a cationic, or a nonionic dispersing agent, about 0.05% to 10% thereof ordinarily being used on the weight of the total monomers. The acid monomer and many of the other functional or polar monomers may be soluble in water so that the dispersing agent serves to emulsify the other monomer or monomers. A polymerization initiator of the free-radical type, such as ammonium or potassium persulfate, may be used alone or in conjunction with an accelerator, such as potassium metabisulfite, or sodium thiosulfate. Organic peroxides, such as benzoyl peroxide and t-butyl hydroperoxide are also useful initiators. The initiator and accelerator, commonly referred to as catalysts, may be used in proportions of 0.1% to 10% each based on the weight of monomers to be copolymerized. The amount, as indicated above, may be adjusted to control the intrinsic viscosity of the polymer. The temperature may be from room temperature to 60° C. or more as is conventional.

Suitable dispersing agents useful in emulsion polymerization include anionic types such as the sodium salts of the higher fatty acid sulfates, such as that of lauryl alcohol, the higher fatty acid salts, such as the oleates or stearates or morpholine, 2-pyrrolidone, triethanolamine or mixed ethanolamines, or any of the nonionic types, such as ethylene oxide modified alkyl phenols, of which tert-octyl phenol modified by 20 to 40 ethylene oxide units is representative, ethylene oxide-modified higher fatty alcohols such as lauryl alcohol, containing 20 to 50 ethylene oxide units, similarly modified long-chain mercaptans, fatty acids, amines, or the like. Mixtures of nonionic and anionic dispersing agents are also useful. The preferred composition is prepared with a nonionic emulsifier or such emulsifier is added after polymerization.

The amounts of emulsifier or emulsifiers required vary primariy with the concentration of monomers to be handled and to a minor extent with choice of emulsifier, monomers, and proportions of monomer. Generally, the amount of emulsifying agent is between 2% and 12% of the weight of the mixture of monomers and is preferably 4% to 7% of this weight. If the dispersion is to contain a relatively low concentration of interpolymer somewhat more than the minimum emulsifying agent indicated by the above rule may prove desirable. In such case, the concentration of emulsifying agent in the aqueous solution may desirably be at least 1 percent of this solution and may be as much as about 7 percent of the weight of the aqueous solution thereof.

As the addition polymerization catalyst, there may be used one or more peroxides which are known to act as free-radical catalysts and which have solubility in aqueous solutions of the emulsifier. Highly convenient are the persulfates, including ammonium, sodium and potassium persulfates or hydrogen peroxide or the perborates or percarbonates. There may also be used organic peroxides, either alone or in addition to an inorganic peroxidic compound. Typical organic peroxides include benzoyl peroxide, tert-butyl hydroperoxide, cumene peroxide, tetralin peroxide, acetyl peroxide, caproyl peroxide, tert-butyl perbenzoate, tert-butyl diperphthalate, methylethyl ketone peroxide, etc. The preferred organic peroxides have at least partial solubility in the aqueous medium containing the emulsifying agent. Choice of inorganic or organic peroxidic catalyst depends in part upon the particular combination of monomers to be interpolymerized, some of these responding better to one type than the other.

The amount of peroxidic catalyst required is roughly proportional to the concentration of the mixture of monomers. The usual range is 0.01% to 3% of catalyst with reference to the weight of the monomer mixture. The preferred range is from 0.05% to 0.5%, while the range of 0.1% to 0.25% is usually best. The optimum amount of catalyst is determined in large part by the nature of the particular monomers selected, including impurities which accompany particular monomers.

Another suitable class of free-radical generating compounds are the azo catalysts. There may be used, for example, azodiisobutyronitrile, azodiisobutyramide, azobis($\alpha,\alpha$-dimethylvaleronitrile), azobis($\alpha$-methylbutyronitrile), dimethyl, diethyl, or dibutyl azobis(methylvalerate). These and other similar azo compounds serve as free-radical initiators. They contain an —N=N— group attached to aliphatic carbon atoms, at least one of which is tertiary. An amount of 0.01% to 2% on the weight of monomer or monomers is usually sufficient.

In order to effect interpolymerization at a temperature below that at which coagulation might occur, it may be desirable to activate the catalyst. This may best be accomplished by using a so-called redox system in which a reducing agent is present in addition to the peroxidic catalyst. Many examples of such systems are known. Agents such as a soluble sulfite, including hydrosulfites, sulfoxalates, thiosulfates, sulfites, and bisulfites can be used. Examples of these are sodium hydrosulfite, sodium metabisulfite, potassium sulfite, zinc formaldehyde-sulfoxalate, and calcium bisulfite. Tertiary amines may also be employed. Redox systems may be activated by the presence of a small amount of polyvalent metal ions. Ferrous ions are commonly and effectively thus used, a few parts per million being sufficient.

The amounts of reducing agent required vary somewhat with the choices of peroxide initiator, reducing activator or agents, and metal promoter, if used, also with the choice of emulsifying agent, and with the particular monomers involved. Within the limits of about 0.5% to 6% with reference to the weight of the mixture of monomers will be found the amount of reducing agent for practically any system. The preferred amounts of sulfite agent or equivalent fall in the range of 0.2% to 1%.

Copolymerization is best effected below about 80° C. A preferred range is 15° to 70° C., although slightly lower and somewhat higher temperatures are permissible. After most of the monomers have been converted to interpolymer, temperatures even higher than 80° C. may then be applied. In fact, after most of the monomers have interpolymerized, the resulting dispersion can be heated to boiling without breaking the dispersion. During interpolymerization, the temperature can be controlled in part through the rate at which monomers are supplied and interpolymerized and/or through applied cooling.

The polymerization process can be carried out batchwise, emulsifying the entire charge of monomers and proceeding with polymerization. It is usually advantageous, however, to start with part of the monomers which are to be used and add more monomoer or monomers as polymerization proceeds. An advantage of gradual addition of monomers lies in reaching a high solids content with optimum control and with maximum uniformity of product. Additional catalyst or additional components of the redox system may also be added as polymerization proceeds.

The water-soluble, heat-convertible condensation products of urea or triazine (e.g., melamine) with formaldehyde and/or their derivatives obtained by reaction with ethanol or methanol can be prepared according to one of the following schemes: (1) control of reaction conditions so that the degree of polymerization is kept very low, even to the monomeric stage, and (2) introduction of hydrophilic groups into the molecules of the polymeric condensates. Thus, they can be made by careful control of reaction conditions as set forth in Schildknecht, "Polymer Processes," Vol. X, page 295 et seq. (Interscience Press, 1956). The preparation of another class of compounds suitable in the present invention, such as N,N'-bis(methoxymethyl)urea is set forth in Bull. Chem. Soc. Japan, Vol. XI, No. 3,239 (1936). In a preferred embodiment of this invention, a mixture of a urea-formaldehyde adduct with methanol and a melamine-formaldehyde adduct with methanol is employed in the coating composition.

The coating composition of this invention preferably contains a material designated as a "coalescent" or a "cosolvent." These materials aid fusion of the film during air-drying prior to baking and promote the flow of the coating composition during the baking cycle. However, because they are volatile they do not form a part of the finished coating. They are characterized by being low in water-solubility, good solvents for the uncured polymer mixture, less volatile than water so that they remain in the film after the water has evaporated, sufficiently volatile so that they are removed from the film before the end of the baking cycle and not susceptible to hydrolysis in alkaline media either at ambient or elevated temperatures. They also serve to lower the surface tension of the aqueous system, making it easier to wet the metal substrate. Typical examples are isophorone (3,5,5-trimethylcyclohexene-2-one-1), 2-ethylhexanol, diacetone alcohol, dimethyl formamide, alkyl ethers of ethylene glycol and propylene glycol, propanol, butanol and tributyl phosphate. The coalescent is preferably present in the coating composition in an amount of from 10 to 20% by weight based on the weight of the solids. The water soluble condensation product of urea or triazine with formaldehyde is usually supplied as an 80% solids solution in isopropanol or an equal volume mixture of isopropanol and butanol which are cosolvents. Therefore, the coating composition will normally contain a coalescent even without additional cosolvent being added. Any coalescent having the properties noted above useful in latex paints is useful in the present invention.

The rheology modifiers which are used in the practice of this invention are materials which are well known in the art. Polyethylene glycols are sold commercially under the name Carbowax. Their preparation is described by Fordyce in J. Am. Chem. Soc., Vol. 61, pages 1905, 1910 (1939). Preferably, a polyethylene glycol is used having a molecular weight of from about 400 to 20,000. Poly(ethylene oxide) is a polyether obtained by polymerizing ethylene oxide. Such materials are sold under the commercial designation Polyox. They may be prepared, for example, by processes as described in U.S. Pat. Nos. 3,365,404; 3,167,519; 3,251,784; and 3,444,102. The poly(ethylene oxide) has an average molecular weight which does not exceed about 100,000. It may be necessary to use conventional methods to depolymerize products produced according to these patents to obtain this molecular weight or lower ones. Such depolymerized products are commercially available. The rheology modifier may be added to the coating system at any stage of preparation—i.e., it may be added to the thermosetting resin emulsion during or after its preparation, it may be added to the composition at the time of mixing with the condensation product of urea or triazine with formaldehyde is added, etc.

Both the "Polyox" and "Carbowax" products are essentially polyoxyethylene polymers having linear chains and having terminal hydroxyl groups. The terminal groups can be varied to include ester groups, ether groups, epoxy groups, or other groups and herein wherever "polyethylene glycols" are referred to, the functionally equivalent linear polyethers having terminal groups other than hydroxyls are intended to be included. Such terminal groups other than hydroxyl should have no more than about two carbon atoms. With products having the molecular weights of the invention, the nature of the end groups on the linear chain have essentially no effect upon the rheology-imparting properties of the polymer. The "Carbowax" type of polyethylene glycols are understood to be prepared by starting with water or ethylene glycol and ethylene oxide and polymerizing in the presence of an alkaline catalyst. The "Polyox" polyethylene glycols are understood to be prepared by ethylene of polyethylene oxide using a different catalyst and in the absence of water or a starter such as a glycol. The latter products may have a molecular weight of several million, having a relatively broad molecular weight distribution as compared with the lower molecular weight polyethylene glycols prepared with a starter. The water-soluble polyethylene oxide materials useful in the invention may be obtained by depolymerizing the products having molecular weights of several million. As suggested above, the polyethylene glycols made with a starter generally have a very narrow molecular weight distribution. These facts show that the molecular weight distribution of the polyether is not particularly critical, and where a molecular weight is given, it is to be understood that this is a number average molecular weight.

The exact mechanism by which the polyethylene glycols and poly(ethylene oxides) act to modify the rheological properties of the coating composition is not known. In the amounts used, they do not act as thickeners for the composition, but actually lower the viscosity of the compositions. It is believed that these compounds may complex with the urea- or triazine-formaldehyde condensation product, thereby decreasing the normal rapid increase in viscosity which occurs with a relatively small increase in solids encountered with the coating compositions in the absence of the rheology modifier. Thus, while the coating composition without the rheology modifier may be set up very fast resulting in striations in the final coating, the coating compositions containing the rheology modifiers flow into a smooth coating before setting up. By the practice of this invention, there is obtained a synergistic effect between the urea or triazine-formaldehyde condensation product and the rheology modifier to give improved flow. That is, the improvement in flow is considerably greater than can be attributed to the additive effect of the condensation product and the rheology modifier each by itself.

Since it is desired to have the mixture of the acrylic dispersion and the aminoplast stable on prolonged storage, and since the aminoplast is reactive under acid conditions, the mixture must be made alkaline. A volatile base, such as ammonia or a tertiary amine as discussed above in connection with acidic monomer salts, is used to make the system alkaline because tertiary amines will not react with the formaldehyde associated with the aminoplast. The tertiary amines also function as corrosion inhibitors when the coating compositions of the present invention are used for coating metal. The tertiary amine must be sufficiently volatile that it will be driven from the film during the baking operation. However, it must not be so volatile that it "flashes" from the film or gasifies if the coating composition is applied by spraying. Particularly preferred because of the balance of properties, availability and economy is triethylamine. The pH of the mixture should be maintained in the range of 9 to 11 in order to ensure good storage stability. However, it is apparent that initial pH control alone is not sufficient to insure adequate stability and retention of properties since samples neutralized to the desired pH range with ammonia have inadequate stability on prolonged storage, although satisfactory films are obtained if the ammonia-neutralized compositions are used shortly after preparation. However, if the tertiary amine is the predominant nitrogen base present, small amounts of ammonia can be used without deleterious effects. The amounts of amine used will vary depending on the specific composition employed but will be in the range of 1 to 5 parts by weight per 100 parts by weight of coating composition (solids basis). A preferred embodiment employs two parts by weight per 100 parts by weight of the coating composition (solids basis).

When pigments are employed, it is essential to employ a dispersant. While a wide variety of dispersants will satisfactorily disperse pigments, the effect of the dispersant on the properties of the final film must be considered. Many dispersing agents remain in the final film unchanged, thus seriously impairing the water-resistance of the film. Other dispersing agents will adversely affect the stabilities of the systems into which they are incorporated.

A preferred embodiment employs as dispersants the ammonium and lower amine salts of polymeric carboxylic acids. Thus, the ammonium and lower amine salts of polyacrylic and polymethacrylic acids and similar salts of the polymeric acid obtained by copolymerizing methyl vinyl ether with maleic anhydride are suitable. A particularly preferred embodiment employs the ammonium half amide salt or the diammonium salt of a diisobutylene-maleic anhydride copolymer having a number average molecular weight of from about 2,000 to about 4,000. The amount of dispersant employed will vary depending on the amount and nature of the pigments used and the amount and nature of the composition employed as binder. Generally, however, from about 0.3 to about 3.5 parts by weight (solids basis) per 100 parts by weight of pigment, will prove to be effective for dispersing the pigment.

It appears that the dispersants of the type hereinbefore described decompose at the temperatures employed in the baking cycle to liberate ammonia or lower amine which is then volatilized. It is further postulated that the carboxylic residuals react either with the amide group of the copolymer or with the aminoplast or both to become insoluble. Regardless of the mechanism involved, the fact that it is observed that this particular class of dispersants, when employed as set forth hereinbefore, do not detract from the excellent water-resistance and other highly desirable properties of the films proves that such catalysis does occur. It has been proven that even clears which contain a small amount of such dispersants exhibit better water- and solvent-resistances than do the same compositions without dispersant, both samples being cured under exactly the same conditions. The amount of dispersant employed in clears varies depending on the amount of aminoplast employed. From about 0.1 to about 1.0 part by weight dispersant per 100 parts by weight (solids basis) of the coating composition will effect the desired catalysis.

The coating compositions of the present invention may be employed as clears, i.e., non-pigmented clear top coatings, or as pigmented coatings. If pigmented, the ratio of pigments to coating solids may be varied widely, depending on the pigment employed and the specific application involved. Thus, the ratio of pigment to coating solids may vary from 1 to 20 to 20 to 1. The clears are particularly useful as "overcoats," i.e., the so-called overprint coatings which are used to protect decorative undercoats without detracting from the decorative effect. Because the clear coatings of the present invention exhibit good clarity, high gloss, excellent solvent- and water-resistance, and high adhesion to a variety of surfaces, they are admirably suited for use as overprint finishes.

Although the coating compositions of this invention are of particular utility for metal decorating, they can be applied to a variety of substrates, the only restriction being the ability of the substrate to withstand the baking cycle which is essential in the processing of said coating compositions. Metals are particularly suitable, whether prime-coated or unprimed. Thus, iron, steel, chrome-plated steel, tin-plated steel, aluminum, copper, bronze, or brass surfaces, particularly in sheet or coil form with thicknesses of 0.05 to 0.20 inches, prove to be excellent as substrates for the coating compositions of the present invention. Ceramic surfaces and, in some instances, wood surfaces, are also suitable as substrates. For roller coating such as reverse roll coating, the thickness is from 0.05 to 5 mils in thickness, preferably 0.2 to 1.5 mils in thickness when not cured.

A wide variety of pigments can be employed with the coating compositions of the present invention. The pigments employed, however, must be stable and non-reactive under alkaline conditions, i.e., a pH from about 9 to about 11. Typical pigments which are suitable include titanium dioxide, iron oxide, calcium carbonate, barytes and numerous types of clays.

The coating compositions of this invention are particularly suitable for application by a direct-roll coater although they may be applied by other means such as a reverse-roll coater or a spray gun. A single roll coater normally applies the coating to the substrate while the applicator roll rotates in a pool of the coating composition. The coatings are then baked at a temperature of from about 250° F. to 350° F. for from about ½ to 10 minutes. The baking or curing operation volatilizes all the volatile material in the film including any remaining water, traces of monomer, coalescents, and the tertiary amine. It is particularly important that the tertiary amine by volatilized since it inhibits the cure of the aminoplast. The baking operation effects the decomposition of the ammonium or amine salts of the polymeric carboxylic acids, apparently releasing the acid form of the copolymer which may then react with the other components to become insoluble. The baking operation causes the cure of the aminoplast which crosslinks and insolubilizes the entire film.

When applied to an Alodine aluminum (Q Panel 612, MIL-C-5441, 0.025 inch thick) dried, the dry film being 1 mil in thickness, and baked for 60 seconds at 500° F., a "soft" resin coating of this invention endures when subjected to the conventional 1-T bend, 2-T bend, 8 inch-pound direct impact, and 22 inch-pound reverse impact tests.

The following examples illustrate the best modes contemplated for carrying out this invention.

EXAMPLE 1

An emulsion copolymer latex of styrene/isobutyl acrylate/hydroxyethyl methacrylate/methacrylic acid in the weight ratios of 38.5/50/10/1.5 (50% by weight total solids in water) is blended with a water-soluble melamine-formaldehyde adduct modified by reaction with methanol, the mole ratio of melamine/formaldehyde/methanol being 1:7:12 (80% total solids in an equal volume mixture of isopropanol and butanol) and 1.3% based on the weight of total solids of a polyethylene glycol having a molecular weight of about 20,000 (Carbowax 20M). The weight ratio of the copolymer to the adduct in the mixture is 60:40. The pH of the composition is adjusted to 9.5 by the addition of triethylamine. The resultant composition has a viscosity of between 150 to 300 cps, a total solids content of 55% by weight and a density of 8.9 pounds per gallon. The weight ratio of water to alcohol in the system is 88:12. The composition is direct roll coated on 90 pounds tin plated steel as a clear over-print varnish for can bodies at 150 feet per minute with a urethane roll of Durometer 20. The flow and leveling of the composition is very good. The coated panels are baked at 325° F. for 10 minutes to obtain a uniformly smooth, hard coating having good mar resistance.

EXAMPLE 2

An emulsion copolymer latex of styrene/butyl acrylate/methacrylamide/methacrylic acid in the weight ratios of 42/54/2.5/1.5 (50% by weight total solids in water) is blended with a water-soluble urea-formaldehyde adduct modified by reaction with methanol, the mole ratio of urea/formaldehyde/methanol being 1:2.5:3 (80% solids by weight in isopropanol). The weight ratio of the copolymer to the adduct is 60:40. To 80 parts by weight of this composition is added 20 parts by weight of a melamine-formaldehyde adduct modified by reaction with methanol, the mole ratio of melamine/formaldehyde/methanol being 1:7:12, and 1.3% by weight of a polyethylene glycol having a molecular weight of about 20,000 (Carbowax 20M). The pH of the composition is adjusted to 9.7 by the addition of triethylamine. The composition has a total solids content of 60% by weight and a viscosity of 50 cps. A ball mill grind is prepared by ball-milling 225 parts by weight of this composition, 225 parts by weight of DuPont Rutile R-960 pigment, 10 parts by weight of solvent (water/butyl Cellosolve in the ratio of 1:1), and small amounts of a pigment dispersant, wetting agent and defoamer. The mixture is ball-milled for 16 hours and the pigmented coating is applied by a directroll coater having urethane rolls of high Durometer rubber (20 Durometer) onto 90 pound tin plated steel as a base white coat for can bodies at 150 feet per minute. The flow and leveling characteristics of the coating composition are very good. The coated panels are baked for 10 minutes at 325° F. Uniformly white, smooth coatings are thus obtained.

EXAMPLES 3 and 4

The process of Example 2 is repeated substituting for Carbowax 20M an equivalent amount of Carbowax 400 (Example 3) and Carbowax 600 (Example 4). The compositions exhibit good flow and leveling characteristics when direct roll coated on a metal substrate.

When each of the above examples, 1 to 4, is repeated omitting the Carbowax, the composition does not exhibit acceptable flow and leveling characteristics.

EXAMPLE 5

The process of Example 2 is repeated substituting a poly(ethylene oxide) (3% by weight based on the solids) having an average molecular weight of about 100,000(Polyox WSRN-10) for the polyethylene glycol of that example. The composition has improved flow and leveling characteristics over that obtained when the poly(ethylene oxide) is omitted.

EXAMPLE 6

A blend of an emulsion copolymer latex and a urea for aldehyde adduct is prepared as described in Example 2 and 2% by weight of the liquid blend of triethylamine and 2.5% by weight of Carbowax 20M are added. The composition has a total solids content of 60% and a pH of 9.0

Ball mill grinds are prepared from the following formulation, parts being by weight: 45 parts DuPont rutile R-960 pigment, 45 parts of the blend described above, 10 parts solvent (water/butyl Cellosolve in the ratio of 1/1), 0.75% pigment dispersant, 0.5% wetting agent, 0.5% defoamer. The mixture is ball-milled for 48 hours. This gives a solids content of about 54%.

For the clear coating, the blend of the urea-formaldehyde adduct and latex is simply diluted to 45% total solids with the same solvent, and 1% by weight of a wetting agent is included in the composition. In this and the following examples, the compositions are direct roller coated (Union Tool No. 5) at 150 feet per minute with hard rollers of neoprene rubber or polyurethane, to give a dry-film thickness of 0.2 to 0.4 mils on both the dried coatings.

The pigmented coating is applied to 90 pound tin plated steel and to anodized aluminum 0.025 inch sheet in thickness, the panels are baked for 10 minutes at 325° F., a wet ink is applied, and the clear overprint varnish immediately applied over the wet ink and baked at 325° F. for 10 minutes. The flow and leveling characteristics of both the clear and the pigmented coatings are acceptable.

EXAMPLE 7

Example 6 is repeated but with a latex prepared by emulsion polymerization of styrene/butyl acrylate/hydroxyethyl methacrylate/methacrylic acid in the ratio of 43/54/1.5/1.5. The flow and leveling characteristics are good.

EXAMPLE 8

Example 6 is repeated with a latex polymer prepared by emulsion methods containing styrene/butyl acrylate/methacrylic acid in the ratio of 44.5/54/1.5. It will be noted that this polymer is outside of the invention.

The coatings of Examples 6, 7, and 8 are then tested for gloss, for hot-stacking to determine whether cured coatings would stick to one another or to bare metal, tested for fabrication by forming into screw caps for bottles with a baking schedule including rebaking the panels for 10 minutes at 400° F. and for 30 minutes at 400° F. The caps formed from the panels are then subjected to dry heat for 10 minutes at 400° F. Another batch of the caps prepared from the panels are subjected to heating for 1 hour with steam under pressure with the gauge pressure being 15 pounds and the temperature 250° F. The gloss of the base white coat of Examples 6, 7, and 8 is comparable at an angle of 60° in the gloss reading device. At 20°, the gloss of Examples 7 and 8 is slightly better than that of Example 6. The hot-stacking test shows Example 6 to be slightly superior to Example 7, Example 8 being markedly inferior to the products of the other examples. After the clear coating is applied over the baked pigmented coating and baked for 10 minutes at 325° F., the hot-stack results showed the product of Example 6 to be markedly superior to the other two, and that of Example 7 superior to that of Example 8, which was unacceptable. After being subjected to overbaking or rebaking the panel of Example 8 at 400° F. for 30 minutes, caps formed therefrom appeared dull. The properties as far as top cracking, knurl failures, and defects in the body, base, lip, and ridge areas of the cap were generally comparable. Caps from the panel having received a 30 minute overbake at 400° F. of Examples 6 and 7 after being subjected to dry heat as described above, had a trace of cracking in the lip area. The product of Example 8 again failed the steam processing test, the products of Examples 6 and 7 being satisfactory after processing, in some cases with a few blisters or a slight wrinkling of the film, where the panel had been overbaked for 30 minutes. The caps of Example 8 were dull, rusted, and water spotted after processing. The remainder of the tests were comparable for the fabrication, dry heat, and processing tests.

In each of the foregoing examples, the cured coating was between about 0.3 mil and 0.5 mil.

We claim:

1. A method of decorating a substrate comprising the steps of coating said substrate with a pigmented or unpigmented thermosettable composition comprising an alkaline aqueous blend having a binder consisting essentially of:

A. a latex of a water-insoluble addition copolymer of (1) 28 to 70% of a monovinyl aromatic monomer, (2) 18 to 68% of at least one ester of acrylic or methacrylic acid, (3) at least one olefinically unsaturated monomer having at least one of an amide and a hydroxyl group, and (4) an olefinically unsaturated monomer having a carboxyl group, the amount of (3) being from 1.5 to 10% when said monomer contains an amide group and from 1.5 to 15% when said monomer contains a hydroxyl group, and the amount of (4) being from 0.5 to 5% based on the total weight of monomers, the $T_g$ of the polymer being below 45° C., the total of (1), (2), (3), and (4) being 100, and B. a water-soluble condensation product of urea or a triazine with formaldehyde or a water-soluble methanol or ethanol ether thereof, the weight ratio of A to B on a solids basis being from 35:65 to 65:35, the minimum film-forming temperature of the composition being no higher than about 25° C., the solids content of the composition being between 40 and 80% by weight, said composition containing from 1 to 5% by weight based on the weight of the solids in the composition of a water-soluble rheology modifier in the form of a polyethylene glycol, the amount of the coating being such as to provide a final cured layer of 0.05 to 5 mils in thickness, and heating the coating until it is thermoset.

2. The method of claim 1 in which B is a urea-formaldehyde reaction product or a melamine-formaldehyde reaction product, or a mixture thereof.

3. The method of claim 1 in which B is the reaction product of a urea-formaldehyde adduct with methanol, the mole ratio of urea:formaldehyde:methanol being in the range of 1/1.17–3/2–3.5; or a melamine-formaldehyde adduct with methanol, the mole ratio of melamine:formaldehyde:methanol being in the range of 1/7–10/12–17, or a mixture thereof.

4. The method of claim 3 in which (1) is styrene or vinyltoluene, (2) is an ester of at least one of acrylic acid and an alkanol having from about 2 to 12 carbon atoms, or an ester of methacrylic acid and an alkanol having from about 6 to 14 carbon atoms, (3) is at least one of methacrylamide, acrylamide, hydroxyethyl acrylate or methacrylate, or hydroxypropyl acrylate or methacrylate, and (4) is acrylic acid, methacrylic acid, or itaconic acid.

5. The method of claim 4 in which (1) is styrene, (2) is butyl acrylate, (3) is at least one of hydroxyethyl methacrylate and methacrylamide, and (4) is methacrylic acid, the respective relative amounts by weight of (1), (2), (3) and (4) are in the ranges up to 28–52/40–68/1.5–5/.5–2, the total being 100, and which composition contains a volatile tertiary amine.

6. The method of claim 5 in which the rheology modifier is a polyethylene glycol having a molecular weight of from about 400 to 100,000.

7. The method of claim 5 containing from 10 to 20% by weight of the solids in the composition of the liquid organic coalescent for the uncured polymer.

8. The method of claim 5 containing a pigment, the relative weight of pigment to A + B being from 5:95 to 60:40, the total being 100.

9. The method of claim 5 in which the ratios of monomers 1/2/3/4 are 35–50/45–60/1.5–3/.5–2.

10. The method of claim 1 in which the substrate is a metal sheet, whichis mechanically shaped after the coating is cured.

11. The method of coating a metal sheet according to claim 5 comprising the steps of direct-roller coating said sheet and mechanically shaping the sheet after the coating is thermoset.

* * * * *